Feb. 23, 1926.
1,573,953

C. F. M. VAN BERKEL

STACKER FOR SLICING MACHINES

Filed May 15, 1924    5 Sheets-Sheet 1

Inventor:
C. F. M. van Berkel
By Nissen & Crane Attys.

Feb. 23, 1926.  
C. F. M. VAN BERKEL  
1,573,953  
STACKER FOR SLICING MACHINES  
Filed May 15, 1924  
5 Sheets-Sheet 2

Inventor:  
C. F. M. van Berkel  
By Nimm & Crane  
Attys.

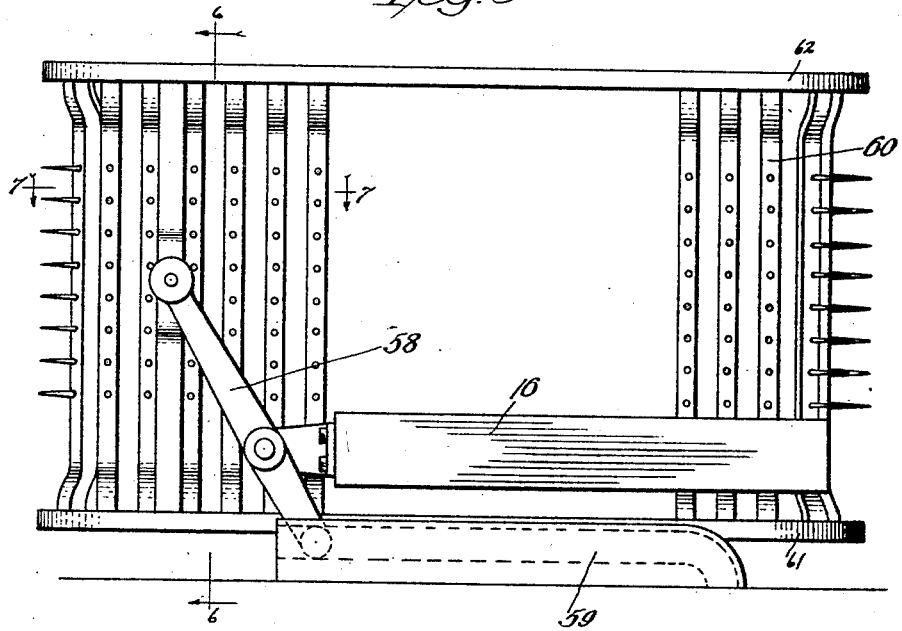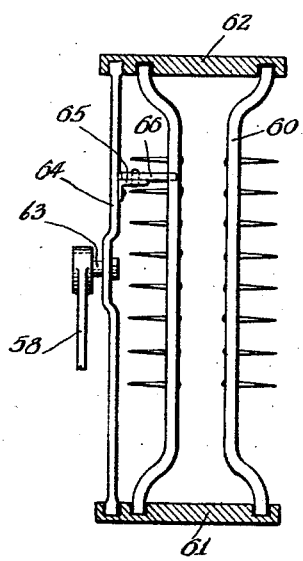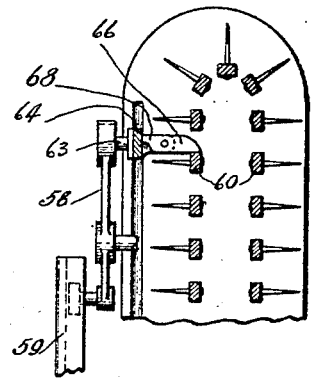

Feb. 23, 1926.

C. F. M. VAN BERKEL 1,573,953

STACKER FOR SLICING MACHINES

Filed May 15, 1924    5 Sheets-Sheet 4

Inventor:
C. F. M. van Berkel
By Nissen & Crane Attys.

Feb. 23, 1926.

C. F. M. VAN BERKEL

STACKER FOR SLICING MACHINES

Filed May 15, 1924

Patented Feb. 23, 1926.

1,573,953

UNITED STATES PATENT OFFICE.

CORNELIS FRANCISCUS MARIA van BERKEL, OF ROTTERDAM, NETHERLANDS, ASSIGNOR TO U. S. SLICING MACHINE COMPANY, OF LA PORTE, INDIANA, A CORPORATION OF INDIANA.

STACKER FOR SLICING MACHINES.

Application filed May 15, 1924. Serial No. 713,396.

*To all whom it may concern:*

Be it known that I, CORNELIS F. M. VAN BERKEL, a subject of the Queen of the Netherlands, residing at Rotterdam, Netherlands, have invented certain new and useful Improvements in Stackers for Slicing Machines, of which the following is a specification.

This invention relates to apparatus for use in connection with machines for slicing meat and similar commodities and has for its object the provision of a slice stacker which shall be of improved construction and which shall operate comparatively noiselessly and with a minimum consumption of power.

Other objects will appear hereinafter.

The invention is exemplified in the combination and arrangement of parts shown in the accompanying drawings and described in the following specification, and it is more particularly pointed out in the appended claims.

In the drawings—

Fig. 5 is a fragmentary plan view of a slice conveyer showing a modified form of the present invention;

Fig. 6 is a section substantially on line 6—6 of Fig. 5;

Fig. 7 is a horizontal section substantially on line 7—7 of Fig. 5;

Figure 1:
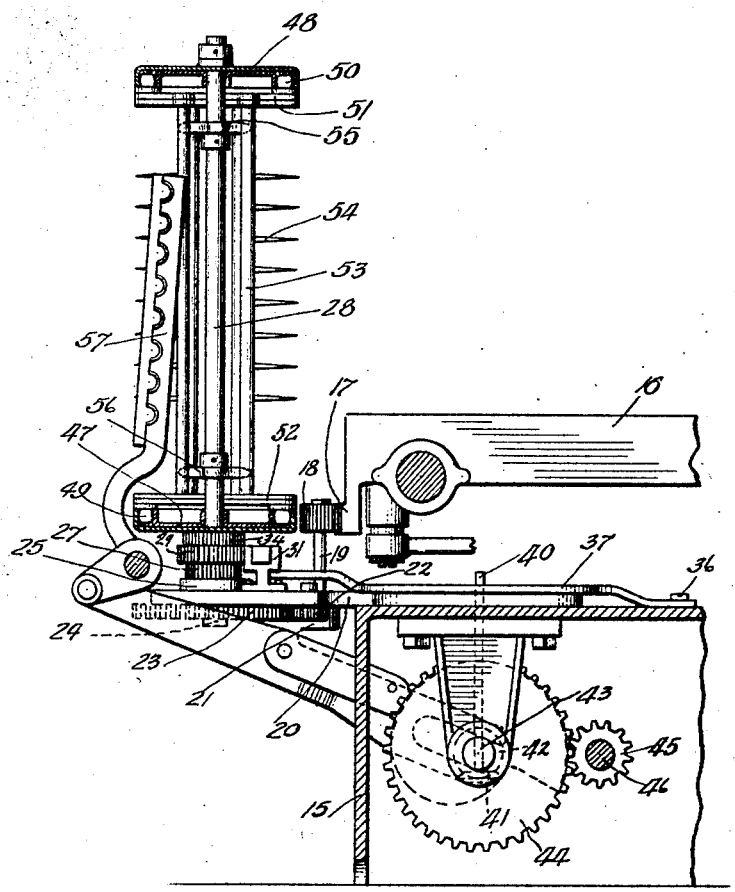
Fig. 1 is a vertical sectional view of a portion of a slicing machine having one embodiment of the present invention applied thereto.
Figure 2:
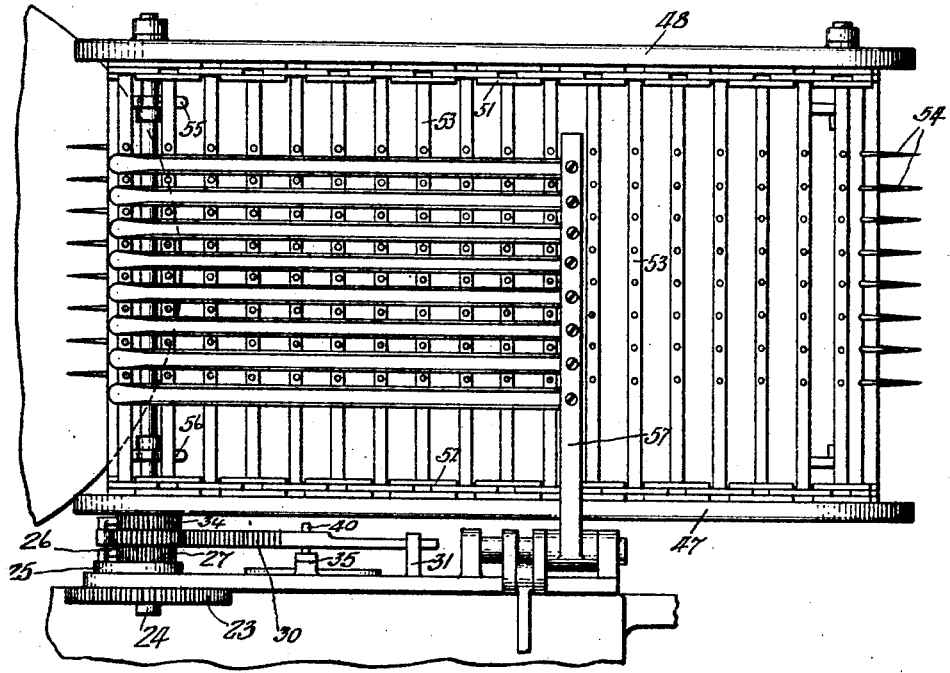
Fig. 2 is a front elevation of the mechanism shown in Fig. 1.
Figure 3:
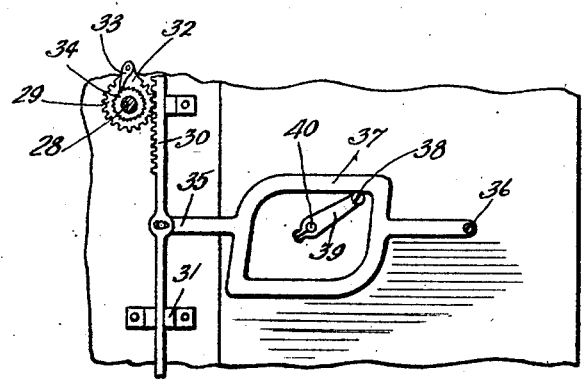
Fig. 3 is a top plan view of a portion of the mechanism shown in Fig. 1.
Figure 4:
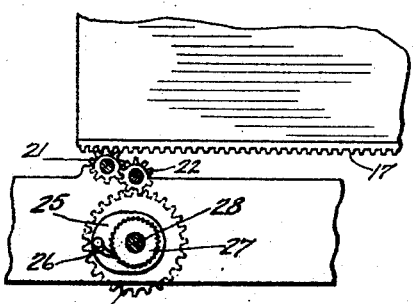
Fig. 4 is a fragmentary horizontal section showing the gear connection between the reciprocating table and the slice conveyer.

Referring first to Figs. 1 to 4, inclusive, the numeral 15 designates the main frame of a slicing machine of the character shown in my prior Patent No. 1,290,425. A table 16 is mounted for reciprocation on the frame 15. The table 16 is provided with a longitudinally extending rack 17 which meshes with a pinion 18 mounted on a shaft 19 supported by a bracket 20 secured to the main frame of the machine. The lower end of the shaft 19 carries a pinion 21 which meshes with an idler 22 which in turn meshes with a gear 23 secured to a stud shaft 24 journaled in the frame 20. The upper end of the stud shaft 24 has a plate 25 fixed thereto provided with a pawl 26 pivoted thereon. The pawl 26 meshes with a ratchet wheel 27 carried by the lower end of a drive shaft 28 which is in axial alinement with the stud 24 but disconnected therefrom. The shaft 28 has a mutilated gear 29 secured thereto and meshing with a rack 30 guided by slide bars 31 supported on the frame 20, as shown in Figs. 2 and 3.

The gear 29 has a projecting ear 32 which carries a pawl 33 engaging a ratchet 34 on the shaft 28. The rack 30 is reciprocated by an arm 35 pivoted to swing about a center 36 on the main frame 15. The arm 35 is provided with a cam loop 37 which engages a roller 38 on a crank arm 39. The arm 39 is carried on a shaft 40 which is journaled in the main frame of the machine and driven by a gear 41 which meshes with a gear 42 on a counter-shaft 43. The counter-shaft 43 is provided with a gear 44 meshing with a pinion 45 on the main drive shaft 46 in the manner shown in Patent No. 1,376,775, granted to A. R. Luschka et al., May 3, 1921.

A guide frame having upper and lower members 47 and 48 is supported on the bracket 20 and receives a series of rollers 49 and 50, respectively, of a slice conveyer chain, the construction being somewhat similar to that of Patent No. 1,376,775 above referred to. The slice conveyer comprises upper and lower chains 51 and 52 which are connected by upright bars 53 carrying slice-engaging prongs 54. The present invention differs from the prior patents referred to in that the chains 51 and 52 are endless chains and are driven by sprocket wheels 55 and 56 carried on the shaft 28. The sprocket wheels 55 and 56 engage the upright bars 53 for imparting movement to the shaft 28. In the patents referred to the movement of the conveyer chain is a reciprocating one, but in the present invention intermittent movement always in one direction is imparted to the endless chain. This avoids the noise and wear incident to arresting the movement of the chain and exerting a force in the opposite direction to reverse the movement. It also avoids the loss of power incident to returning the chain to its initial position for receiving a new slice. A further advantage is that the force for operating the chain is equally effective at the top and bottom of the conveyer so that there is no binding in the guides for the rollers 50.

In operation, during the forward movement of the table 16 the chain is driven in unison with the table through the gears 18, 21, 22 and 23 and the ratchet wheel 27. As the table 16 approaches the end of its cutting stroke and after the slice has been severed the crank arm 39 imparts a forward movement to the rack 39 through the arm 35 and cam 37. The rotation of the gear 29 by the rack 30 transmits an accelerated motion to the shaft 28 so that the slice conveyer continues to move at an accelerated rate after the slice has been severed to carry the slice around the end of the conveyer and into a flat position at the front of the conveyer adjacent the discharge fly 57. During this accelerated motion the pawl 26 will overrun the ratchet 27. The cam 37 is shaped to continue the accelerated movement of the conveyer chain during a portion of the return stroke of the table 16, the motion of the chain being sufficient to bring the slice into position to be discharged by the fly 57. The chain is given a period of rest during the latter portion of the return stroke of the table 16 at which time the discharge fly is operated to discharge the slice from the conveyer in the manner described in connection with the prior patents referred to. The reverse movement of the table 16 and rack 30 does not affect the position of the conveyer so that the conveyer remains in its advanced position until forward movement is again imparted thereto during the succeeding slicing operation.

Figure 10:
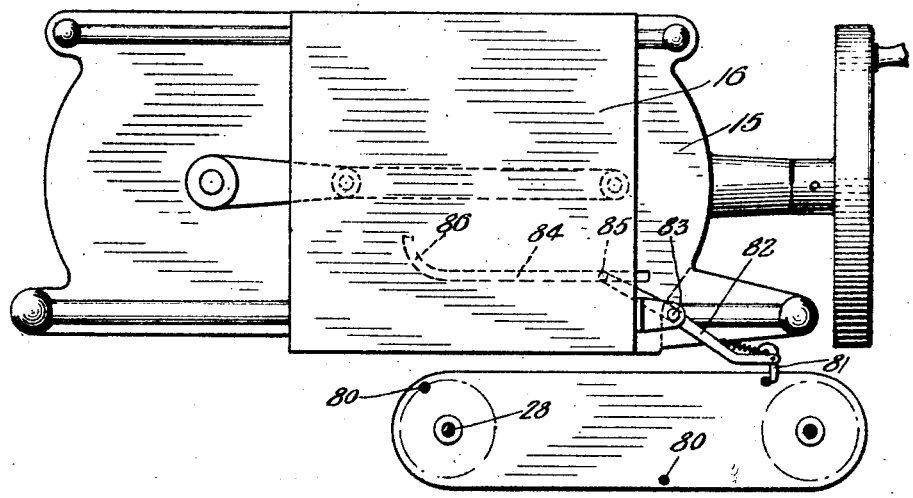
Figs. 10 and 11 are views similar to Figs. 8 and 9, respectively, showing a further modification.

In the form of the invention shown in Figs. 5, 6 and 7 an operating arm 58 is pivoted to the reciprocating table 16 and is controlled by a cam groove 59, the movement of the arm 58 being similar to that of the arm 27 in my prior patent referred to above. In the present invention, however, an endless slice conveyer is provided having upright bars 60 sliding in frame members 61 and 62. The arm 58 is pivoted at 63 to an upright bar 64 slidably mounted in grooves in the plates 61 and 62. The bar 64 is provided with a bracket 65 which carries a spring-pressed pawl 66 free to yield in a clockwise direction, as viewed in Fig. 7, but held against movement in the opposite direction by a tailpiece 68. It will be seen that when the bar 64 is drawn forwardly by the arm 58 during the slicing movement of the table 16 the pawl 66 will engage one of the upright bars 60 and carry the conveyer forwardly with the same character of movement imparted to it in the prior patents referred to. On the reverse movement of the table, however, the conveyer will remain stationary and the pawl 66 will ratchet backwardly over the bars 60 so that intermittent movement in one direction only is imparted to the conveyer. It will be apparent that in place of engaging the bars 60 the conveyer could be provided with special contact members for the pawl 66 properly spaced so that the pawl need not engage all of the bars 60 on its return movement. This arrangement is illustrated in Fig. 10 where the conveyer is given a movement equal to one-third of its length at each operation of the reciprocating table and three contact rods are provided for the actuating pawl. The contact rods extend in a straight line between the grooves in the guide plates 61 and 62 and are not curved as are the conveyer bars. This permits the pawl to engage only the contact rods and free the conveyer bars. The contact rods in each instant will replace one of the conveyer bars since there is no necessity for slice-engaging spikes at the position on the conveyer occupied by the contact rod.

Figure 8:
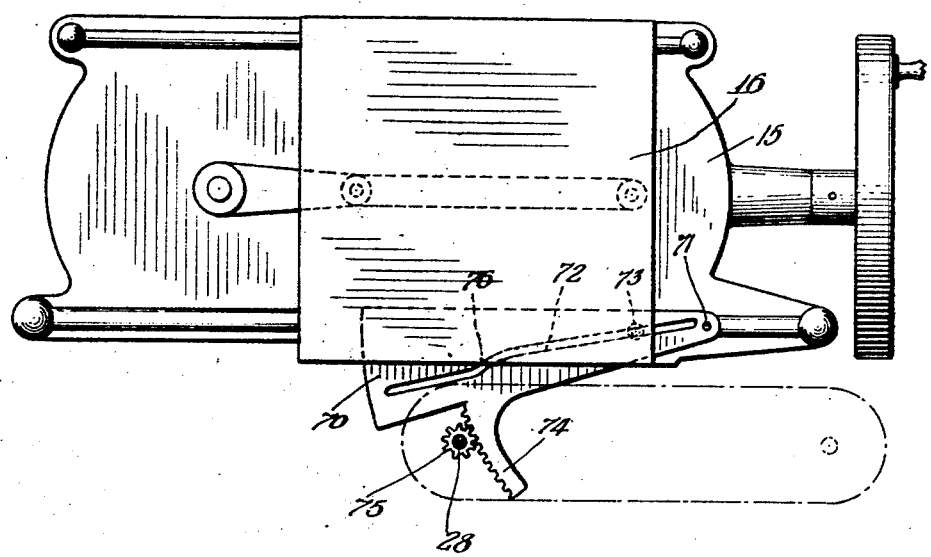
Fig. 8 is a top plan view of a portion of a slicing machine showing a modified form of the invention.
Figure 9:
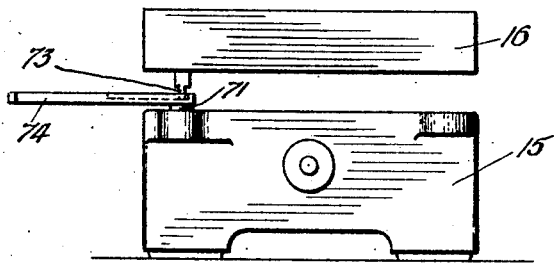
Fig. 9 is an end elevation of the mechanism shown in Fig. 8.

In the form shown in Figs. 8 and 9 a cam plate 70 is pivotally mounted at 71 on the base frame 15. The cam plate 70 is provided with a slot 72 which receives the downwardly projecting end of a pin 73 carried on the table 16. A rack segment 74 engages a pinion 75 having a one-way driving connection with the shaft 28. As the table moves forwardly the pin 73 will travel in the straight portion of the slot 72 and imparts a movement to the slice conveyer in unison with the movement of the table. After the slice has been severed the pin 72 will reach an offset portion 76 in the slot 72 and impart an accelerated movement to the conveyer to carry the slice around the end of the conveyer frame to the front and in position to be discharged by the fly. This will bring the extreme portion of the slot 72 into a line parallel with the movement of the pin 73 so that the conveyer will remain stationary at the time that the fly is operated.

Figure 12:
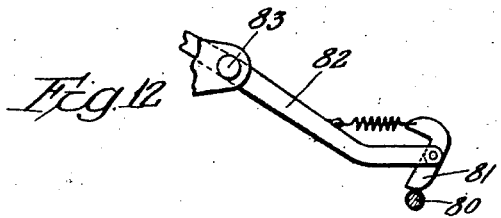
Fig. 12 is a fragmentary detail showing a portion of the operating mechanism of Fig. 10 in a different position.
Figure 11:
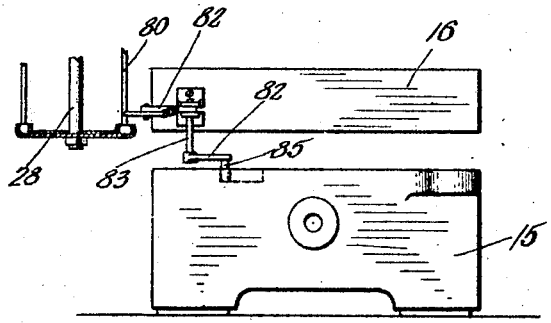

In the forms of the invention shown in Figs. 10, 11 and 12 the conveyer chain is provided with a series of spaced contact bars 80 which are engaged by a pawl 81 carried by a horizontal arm 82 pivoted at 83 on the table 16. The pawl 81 is free to yield to the contact bars 80, as shown in Fig. 12, when the arm 82 moves rearwardly but is held against yielding movement, as shown in Fig. 10, to carry the contact bars 80 forwardly during the slicing movement of the table 16. A cam groove 84 is formed in the top of the base frame 15 and receives a pin 85 projecting downwardly from the end of the arm 82. The arm 82 may be formed in two parts connected to the pivot shaft 83 so as to provide for the relative vertical displacement of the two parts of the arm. As previously explained, the contact rods 80 are spaced outwardly from the conveyer bars so that the pawl 81 will engage only the contact rods. These rods are spaced apart on the conveyer chain a sufficient distance to impart the necessary movement of the chain for conveying the slices to discharge position. An accelerated movement is given to the chain at the end of the slicing operation by a curved portion 86 in the cam groove 84. This will rotate the arm 82 upon its pivot 83 and project the pawl 81 away from the table 16 so as to follow the contact rod 80 in its movement about the center shaft 28 of the slice conveyer.

I claim:

1. In a slicing machine, the combination with a slicing knife, of a slice conveyer for receiving slices formed by said knife, and means for imparting successive intermittent movements to said slice conveyer in the same direction, each movement beginning where the previous one was discontinued.

2. In a slicing machine, the combination with a slicing knife, of a conveyer for transferring slices away from said knife, and means for imparting movement to said conveyer in one direction only.

3. In a slicing machine, a slicing knife, a conveyer for transferring slices away from said knife, means for imparting intermittent movement to said conveyer in one direction only, and means for feeding material to said knife for slicing a separate slice therefrom for each movement of said conveyer.

4. In a slicing machine, the combination with a slicing knife, of an endless conveyer for transferring slices away from said knife, and means for imparting intermittent movement to said conveyer in one direction only.

5. In a slicing machine, the combination with a slicing knife, of means for periodically presenting material to said knife to be sliced, an endless conveyer for transferring slices away from said knife, and means for driving said conveyer in one direction only, said driving means operating intermittently in timed relation with said material presenting means.

6. The combination with a slicing knife, of a conveyer frame adjacent said knife, an endless conveyer arranged to travel on said frame, and means for moving a different portion of said conveyer adjacent said knife during successive slicing operations to transfer slices away from said knife.

7. In a slicing machine, the combination with a slicing knife, of an endless conveyer arranged adjacent said knife with the runs thereof substantially parallel to one another, means for periodically feeding material to said knife to be sliced, and means operating in timed relation with said feeding means for imparting intermittent movement to said conveyer in one direction only.

8. The combination with a slicing machine having a reciprocating table, of a conveyer for receiving slices from said machine, and a one-way drive for actuating said conveyer in timed relation with the reciprocation of said table.

9. The combination with a slicing machine having a slicing knife, a reciprocating table for feeding material to said knife, a one-way drive for imparting movement to said conveyer in timed relation with the reciprocation of said table, and a second one-way drive for additionally operating said conveyer in the same direction in which it is moved by said first-mentioned drive.

10. The combination with a slicing machine having a reciprocating table, a slicing knife, a conveyer for receiving slices from said knife, and a one-way drive actuated by said table during movement thereof in one direction for imparting movement to said conveyer but permitting return movement of said table without affecting said conveyer.

11. The combination with a slicing machine having a reciprocating table and a slicing knife, of a conveyer for receiving slices formed by said knife, a one-way drive for imparting movement to said conveyer during feeding movement of said table but permitting return movement of said table without affecting said conveyer, and a second one-way drive for imparting accelerated movement to said conveyer in the same direction in which it is moved by said first-mentioned one-way drive.

12. In a slicing machine, a slicing knife, an endless conveyer for receiving slices from said knife, a reciprocating table for feeding slices to said knife, a sprocket wheel for operating said conveyer, and a one-way drive for actuating said sprocket wheel in timed relation with the movement of said table.

13. The combination with a slicing machine having a slicing knife, a reciprocating table for feeding material to said knife, a rack movable with said table, an endless conveyer for receiving slices from said knife, gearing actuated by said rack, and ratchet mechanism operated by said gearing for imparting a reciprocating movement to said conveyer in one direction only.

14. The combination with a slicing machine having a slicing knife and a reciprocating table, of an endless conveyer for receiving slices from said knife, a shaft having sprockets thereon for driving said conveyer, ratchet mechanism actuated by said table during movement in one direction thereof for rotating said shaft, and additional ratchet mechanism for imparting an accelerated movement to said shaft in the same direction as the movement imparted thereto by said first-mentioned ratchet mechanism.

15. The combination with a slicing machine having a slicing knife, a reciprocating table for feeding slices to said knife, and driving means for said table and said knife, of a conveyer for receiving slices from said knife, a one-way drive operated by said table for actuating said conveyer during feeding movement of said table, and a second one-way drive actuated by said driving means for said knife and table impart an accelerated movement to said conveyer in the same direction as the movement imparted thereto by said reciprocating table.

16. In a slicing machine, a discharge member, a conveyor for conveying cut slices to said discharge member, and means for intermittently moving said conveyor in one direction only.

17. In a slicing machine, a meat support, means for imparting irregular movement to said meat support, a discharge member, a conveyor for conveying cut slices to said discharge member, and means for imparting intermittent movement to said conveyor in one direction only, said conveyor moving in unison with said meat support during a portion of each intermittent movement of said conveyor.

18. In a slicing machine, a meat support, means for reciprocating said meat support, a discharge member, a conveyor for conveying cut slices to said discharge member, means for moving said conveyor intermittently in one direction only, in unison with the movement of said meat support, and means for imparting accelerated movement to said conveyor during the latter portion of each intermittent movement thereof.

In testimony whereof I have signed my name to this specification on this sixteenth day of April A. D. 1924.

CORNELIS FRANCISCUS MARIA van BERKEL.